United States Patent [19]

Baker

[11] 4,057,826
[45] Nov. 8, 1977

[54] SYNC RESPONSIVE SYSTEMS FOR VIDEO DISC PLAYERS

[75] Inventor: Alfred Lynn Baker, Indianapolis, Ind.

[73] Assignee: RCA Corporation, New York, N.Y.

[21] Appl. No.: 590,485

[22] Filed: June 26, 1975

[30] Foreign Application Priority Data

Nov. 18, 1974 United Kingdom ............... 49925/74

[51] Int. Cl.$^2$ .................... H04N 5/785; H04N 9/02
[52] U.S. Cl. ........................................ 358/4; 358/8
[58] Field of Search ................. 358/4, 8, 20, 34, 127, 358/153, 155; 360/33; 178/6.6 A, 6.6 R, DIG. 26, 7.3 DC, 7.5 DC; 328/58; 307/237, 266

[56] References Cited

U.S. PATENT DOCUMENTS

| 3,728,475 | 4/1973 | Inoue et al. | 358/4 |
|---|---|---|---|
| 3,830,961 | 8/1974 | Narahara | 358/4 |
| 3,845,497 | 10/1974 | Inoue et al. | 358/8 |
| 3,872,498 | 3/1975 | Pritchard | 358/21 |
| 3,925,810 | 12/1975 | Ishigaki et al. | 358/4 |
| 3,969,757 | 7/1976 | Amery | 358/4 |

Primary Examiner—John C. Martin
Attorney, Agent, or Firm—Eugene M. Whitacre; William H. Meagher

[57] ABSTRACT

Video disc player is provided with a sync separator which is responsive to output of luminance comb filter after de-emphasis circuit processing. Input to comb filter circuitry is provided by amplitude modulator, responsive to carrier wave oscillations from a voltage controlled oscillator (VCO) and to composite video signals provided by a defect compensation system. The compensation system normally supplies an output directly derived from the player's pickup circuits, but, under defect conditions, substitutes stored video signals. The VCO is a component of a phase locked loop (PLL) arrangement, also including a burst gate for selectively passing color synchronizing information contained in the modulator output. Gating pulses for the burst gate are generated by apparatus responsive to the sync separator output, the generating apparatus including a capacitor charging circuit activated by the trailing edge of a separator output pulse to control gating pulse termination, and a separate capacitor discharging circuit activated by the trailing edge of a separator output pulse to control gating pulse initiation. Also responsive to an output of the sync separator is a keying pulse generator for controlling keyed clamping of the luminance comb filter output, with keying pulse timing determined by differentiated and integrated versions of the separator output.

11 Claims, 8 Drawing Figures

SYNC RESPONSIVE SYSTEMS FOR VIDEO DISC PLAYERS

The present invention relates generally to video disc player apparatus and sync responsive systems therefor, and particularly to circuit arrangements for advantageously effecting sync signal recovery and utilization during playback of a video disc.

In U.S. Pat. No. 3,872,498, issued on Mar. 18, 1975 to Dalton H. Pritchard, a color encoding format is disclosed wherein a chrominance signal in the form of a modulated subcarrier is "buried" in the midband of a wider band luminance signal. Comb filtering of the luminance signal midband prepares "troughs" in the luminance signal frequency spectrum. The chrominance signal is subject to complementary comb filtering to confine it to components falling in the vacated troughs of the luminance signal frequency spectrum. An illustrative use of this encoding format is in video disc recording. U.S. Pat. No. 3,842,194, issued to Jon K. Clemens of Oct. 15, 1974, describes a variable capacitance video disc system which is illustrative of disc systems in which the buried subcarrier encoding format may be advantageously employed.

In one contemplated form of player apparatus for a video disc record, the player apparatus does not incorporate image display equipment but rather serves as a form of attachment or auxiliary equipment for use with a separate color television receiver (the image display equipment of the latter serving for display of the recorded color image information). In such a player attachment, it is desirable that an output composite signal be developed that appears in the format (e.l., the NTSC format) which the color television receiver is designed to handle. Thus, for player attachments usable with video disc records employing the buried subcarrier format, it is desirable to provide the player with means for converting an input composite signal of buried subcarrier format to an output compositesignal of a different encoding format (e.g., NTSC format) compatible with the color television receiver processing circuitry design. Of course, such conversion apparatus may also be desirably employed in other forms of video disc player apparatus, such as one of the combination type, where a single unit incorporates both color video disc playing equipment and broadcast color television receiving equipment and the economy inhering in use of common color decoding equipment for both disc and broadcast signals dictates the desirability of disc signal conversion.

In video disc playback operations, one may encounter, for a variety of reasons, undesired variations of the speed of relative motion between the pickup stylus and the record groove that may result in spurious variations of the recovered signal frequencies. While the spurious variations may be significantly reduced through association of an appropriately controlled "armstretcher" with the player's pickup arm assembly, as described, for example, in U.S. Pat. No. 2,711,641, issued to R. C. Palmer on Jan. 16, 1973, residual variations of the recovered signal frequencies will normally be encountered. Thus, for example, the color subcarrier sideband frequencies in a recovered composite signal of the "buried subcarrier" type may be subject to "jitter" about their otherwise expected locations in the frequency spectrum, with the accompanying luminance signal component frequency locations subject to a similar jitter.

In U.S. Pat. No. 3,872,497, issued on Mar. 18, 1975 to J. G. Amery, et al., arrangements for transcoding recovered signals from a buried subcarrier format to another format compatible with color television receiver circuitry are disclosed, employing techniques which reduce deleterious effects of the presence of "jitter". In such arrangements described in the aforesaid Amery, et al. patent, an amplitude modulator is employed, wherein heterodyning of the recovered buried subcarrier composite signal (or a portion thereof) with local oscillations precedes comb filtering. The source of local oscillations is caused to have substantially the same "jitter" as the recovered signal components (e.g., by rendering the local oscillation source responsive to the frequency variations suffered by the color synchronizing component which accompanies the buried subcarrier chrominance signal). The product of heterodyning with such local oscillations is substantially jitter-free; comb filtering of the product may be carried out with a single 1H delay line form of comb filter to obtain a separated chrominance signal with crosstalk freedom relatively independent of the original "jitter".

By appropriate choice of the nominal frequency of the local oscillations, the heterodyning step that effects jitter stabilization of the chrominance signal may also serve to shift the chrominance signal from its midband location in the input (buried subcarrier) format to the high-band location desired for the output (e.g., NTSC) format, whereby subsequent comb filtering (in the highband spectral region) to eliminate luminance signal components provides a highband chrominance signal for direct inclusion in an output composite signal.

In a copending U.S. patent application, Ser. No. 570,325, of John G. Amery, now U.S. Pat. No. 3,969,757, there is disclosed a particularly advantageous form of apparatus for effecting the aforesaid composite signal transcoding. In accordance with an illustrative arrangement of such apparatus, composite video signals of the aforesaid buried subcarrier format are recovered by playback of a video disc and are applied to an amplitude modulator, also receiving carrier waves that "jitter" about a nominal value (corresponding to the sum of the buried color subcarrier frequency and the desired output color subcarrier frequency) in consonance with the "jitter" if any, of the recovered signals. The modulator output is applied to the input of a 1H delay line. The subtractive combination of the modulated carrier waves from both the input and the output of the delay line, followed by suitable bandpass filtering, provides a highband chrominance signal output, combed free of luminance components. The delay line output is also applied to an amplitude modulation detector. The detector output is additively combined with the input composite signal to obtain luminance signal components, combed free of chrominance signal components. A phase inverted version of the detector output is also added to the input composite signal, and the sum is applied to a low pass filter to obtain a vertical detail signal. Combination of the vertical detail signal with the other combed luminance signal components develops an output luminance signal, suitable for addition to the combed highband chrominance signal to form the desired output composite signal.

In further accordance with the illustrative arrangement of the aforesaid Amery patent, the output of the aforesaid amplitude modulation detector also conveniently serves as substitution signal input to the aforesaid amplitude modulator under defect pickup conditions (as determined by suitable monitoring of the signals recovered from the disc).

In video disc player apparatus, such as, for example, of the type described in the aforesaid Amery patent, there is a need for reliable separation of the deflection synchronizing components of the recovered composite video signals. An illustrative reason for such need is associated with the jitter stabilization requirements described above. An advantageous manner of achieving the desired compensating jitter of the carrier waves supplied to the aforementioned amplitude modulator involves use of a phase locked loop (PLL) system, with the carrier waves generated by a voltage controlled oscillator (VCO), and control of the VCO effected in response to the output of a phase detector, serving to compare the phase of the color synchronizing burst component in the modulator output with the output of a highly stable (e.g., crystal controlled) reference oscillator. For correct operation of such a PLL system, a source of accurately timed burst gating pulses is required.

The present invention is concerned with player circuit arrangements permitting reliable separation of deflection synchronizing components from composite video signals recovered during playback of a video disc, with an illustrative use of the separated sync components being control of the aforesaid gating pulse generation. Pursuant to an illustrative embodiment of the invention, the sync separator circuitry responds to an output of the player's luminance comb filter prior to the recombination of such output with chrominance information, whereby spurious response of the sync separator to color synchronizing burst components of the recovered signals is substantially precluded. Association of the luminance comb filter with a defect compensation system, as in the manner previously described, moreover permits the sync separator, responding to the luminance comb filter output, to continue proper performance during defect pickup conditions in isolation from noise appearing in the pickup circuits under such conditions.

Pursuant to an additional feature of the present invention, desirable where video frequency pre-emphasis has been employed in the video disc recording process, the luminance comb filter output is subject to video frequency de-emphasis processing prior to application to the sync separator input. Such use of de-emphasis lessens the possibility of spurious sync separator response to noise, as well as substantially precluding false sync separator interpretation of high frequency picture signal components as synchronizing components.

Pursuant to a further feature of the present invention, of interest where it is desired to employ the sync separator output to control timing of burst gating pulses, as previously discussed, an arrangement is provided for initiating the charging of a first capacitor in a first time constant circuit in response to the trailing edge of a separator output pulse, while substantially simultaneously initiating the discharging of a second capacitor in a second time constant circuit. A A burst gating pulse, suitably delayed relative to the separated sync pulse, is developed with its initiation controlled by the second time constant circuit and its termination controlled by the first time constant circuit.

Pursuant to an additional feature of the present invention, of interest where it is desired to restore the DC component of the recovered luminance information (as by use of a keyed clamp circuit responding to the de-emphasized output of the luminance comb filter), clamp keying pulse generating apparatus responds to respective differentiated and integrated versions of an output of the sync separator. The integrated version serves to delay the keying pulse initiation relative to the sync pulse leading edge, while the differentiated version serves to effect keying pulse termination prior to the sync pulse trailing edge, whereby correct timing of the operation of the keyed clamp circuit is substantially assured.

Objects and advantages of the present invention will be apparent to those skilled in the art upon a reading of the following detailed description and an inspection of the accompanying drawings wherein:

Figure 1:
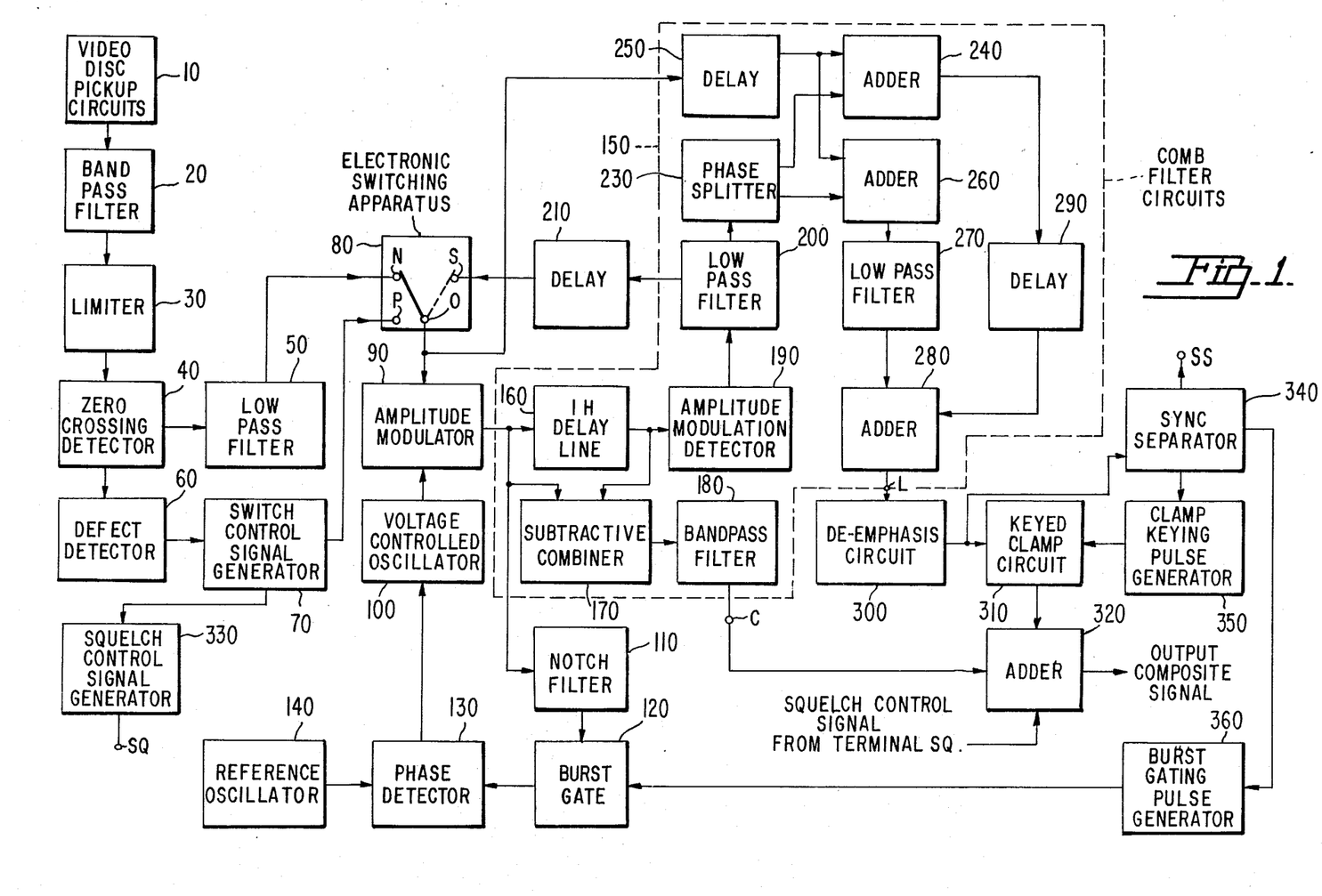
FIG. 1 illustrates, by block diagram representation, video disc player apparatus incorporating sync responsive systems pursuant to an embodiment of the present invention.

In the video disc player arrangement of FIG. 1, a recorded signal is recovered during playback of a video disc by video disc pickup circuits 10. Illustratively, the video disc pickup system is of the capacitive type described in the aforementioned Clemens patent, and the structure and circuit arrangement of the video disc pickup circuits 10 may be, for example, as described in U.S. Pat. No. 3,872,240, issued to D. J. Carlson, et al. on Mar. 18, 1975. Illustratively, the recording format for the disc is such that the recovered signal information includes a frequency modulated picture carrier, the instantaneous carrier frequency deviating within fixed deviation range limits (e.g., 3.9 – 6.9 MHz) in accordance with the amplitude of a composite video signal occupying a band of frequencies (e.g., 0 – 3 MHz) below the deviation range, and representative of a succession of color images to be displayed.

A bandpass filter 20, having a pass band encompassing the picture carrier deviation range and appropriate sidebands thereof, selectively passes the frequency modulated picture carrier signal to a limiter 30 (serving the conventional purpose of removing or reducing spurious amplitude modulation of the input FM signal). The limiter output is applied to a zero-crossing detector 40. The zero-crossing detector may comprise circuits of well-known type for developing an output pulse of a fixed amplitude, width and polarity in response to each zero-crossing of the limited input FM signal. The pulse output of the zero-crossing detector 40 is supplied to a low pass filter 50, having a pass band substantially matching the band (e.g., 0 – 3 MHz) occupied by the recorded video signal information.

The zero-crossing detector 40 and low pass filter 50 form an FM detector of a so-called pulse counter type, providing an output in the form of a composite video signal corresponding to the modulation of the input FM signal. Illustratively, the video signal information recovered from the disc comprises a composite color video signal encoded in a "buried subcarrier" format, as disclosed in the aforementioned Pritchard patent.

For purposes of illustration, the following parameters may be assumed to be descriptive of the buried subcarrier form of the recorded composite color video signal:
1. Color subcarrier frequency $(f_b) = 195/2\, f_H$, or approximately 1.53 MHz, when the line frequency $(f_H)$ corresponds to the U.S. standard for color television broadcasting;
2. Chrominance signal: sum of respective quadrature related subcarrier phases respectively amplitude modulated with red and blue color difference signal (R-Y, B-Y) of 0 – 500 KHz bandwidth, with equal bandwidth (500 KHz) upper and lower sidebands preserved (and carrier suppressed);
3. Luminance signal (Y) bandwidth: 0 – 3 MHz;
4. Color synchronizing component: burst of oscillations at buried subcarrier frequency $(f_b)$ of reference phase and amplitude, during horizontal blanking "backporch" (corresponding to standard NTSC color synchronizing component in all but frequency).

Also responding to an output of the zero-crossing detector 40 is a defect detector 60, which may, illustratively, be of the type shown in the copending U.S. patent application of J.K. Clemens, et al., Ser. No. 477,102, filed on June 6, 1974, now abandoned. The defect detector 60 serves to detect randomly occurring disturbances of the input FM signal, that tend to produce white and/or black spots and streaks supplanting the appropriate picture information in reproductions of the recorded images. Defect indication pulses developed by the defect detector 60 are supplied to a switch control signal generator 70, which develops signals for controlling the switching state of electronic switching apparatus 80. Reference may be made to the copending U.S. Patent Application of A. L. Baker, Ser. No. 477,103, now U.S. Pat. No. 3,909,518, for a detailed description of suitable apparatus for performing the functions of generator 70 and switching apparatus 80.

Electronic switching apparatus 80 serves the purpose of alternatively: (1) completing a signal path between a "normal" signal input terminal N and the switching apparatus output terminal 0, or (2) completing a signal path between a "substitution" signal input terminal S and the output terminal O. Switching between the respective "normal" and "substitution" states is controlled by the output of switch control signal generator 70, which is applied to the control signal input terminal P of the switching apparatus 80.

The output terminal 0 of the switching apparatus 80 is coupled to the modulating signal input terminal of an amplitude modulator 90. The "normal" input signal to the switching apparatus 80 (i.e., the signal applied to terminal N, and conveyed therefrom to the modulating signal input terminal of modulator 90 during the normal mode of operation of the video disc player) is the composite video signal output of low pass filter 50. The "substitution" input signal (i.e., the signal applied to terminal S, and conveyed therefrom to the modulating signal input terminal of modulator 90 during a defect masking, or "substitution", mode of operation of the player) is a delayed composite video signal derived in a manner to be subsequently described.

Amplitude modulator 90 serves to modulate the amplitude of carrier waves, supplied by a voltage controlled oscillator 100, in accordance with the signals delivered from the switching apparatus output terminal 0. Amplitude modulator 90 is desirably of the singly balanced type (balanced against the modulating signal).

The normal frequency $(f_c)$ of the carrier waves supplied by oscillator 100 corresponds to the sum of the buried subcarrier frequency $(f_b)$ and the desired output subcarrier frequency $(f_o)$, and illustratively corresponds to 325 $1 f_H$, or approximately 5.11 MHz (for instance where the desired output subcarrier frequency corresponds to the NTSC subcarrier frequency of $455/2 f_H$, or approximately 3.58 MHz.). Illustratively, oscillator 100 is a voltage controlled crystal oscillator such as is shown in the copending U.S. patent application of T. Burrus, Ser. No. 522,816, now U.S. Pat. No. 3,965,482.

Desirably, the frequency of the carrier waves developed by oscillator 100 varies about the aforesaid nominal frequency in consonance with the "jitter" of the frequencies of the composite video signal recovered during record playback. For this purpose, the voltage controlled oscillator 100 is associated with control circuitry in an arrangement forming a phase locked loop system, such as disclosed in the aforesaid Amery, et al. patent.

In the control arrangement of the herein illustrated video disc player apparatus, the output frequency of oscillator 100 is controlled by the output of a phase detector 130, which compares in phase the color synchronizing component recovered from the record, and the output of a reference oscillator 140. Reference oscillator 140 operates at the desired output subcarrier frequency $(f_o)$, and is desirably crystal controlled. The color synchronizing component is supplied by a burst gate 120, which responds to an output of amplitude modulator 90 supplied via a notch filter 110. Notch filter 110 bars passage of the relatively large amplitude carrier component in the modulator output.

Burst gate 120 desirably incorporates bandpass filter circuitry confining its response to frequencies in the output chrominance band about the output subcarrier frequency $(f_o)$. Controlled by suitably timed, line frequency, gating pulses the burst gate 120 selectively passes the filtered output of modulator 90 appearing during the "backporch" interval occupied by the color synchronizing component. The output of burst gate 120 comprises periodic bursts of oscillations which will nominally be at the output subcarrier frequency, the synchronizing bursts falling at that frequency in the lower sideband of the output of modulator 90.

The closed loop system formed in the manner described immediately above functions to hold the synchronizing burst component in the lower sideband of the output of modulator 90 in frequency (and phase) synchronism with the highly stable output of reference oscillator 140. As jitter of the recovered composite video signal occurs, tending to cause a departure from such synchronism, the control voltage output of a phase detector 130 produces a compensating adjustment of the output frequency of oscillator 100 to oppose such departure.

The amplitude modulated carrier wave output of modulator 90 is applied to the input of a 1H delay line 160. The delay line 160, providing a delay substantially corresponding to a period at the nominal line frequency $(f_H)$, may illustratively comprise a glass delay line of the Amperex DL56 type. By suitable selection of the parameters of the delay line input and output terminations, the passband of such delay line may be readily adjusted to accommodate a band of frequencies extending from slightly above $f_c$ (e.g., 5.11 MHz) to slightly below the lowest color sideband frequency (e.g., $f_o - 500$ KHz, or 3.08 MHz) for the output color subcarrier.

Signals from both the input and the output of delay line 160 are applied to a subtractive combiner 170. The delay line terminal selections are such that the subtractive combination of the signals derived therefrom produces a comb filtering action of a type permitting chrominance component passage. The frequency response characteristic of the comb filter thus realized has (over a frequency band corresponding to the passband of delay line 160) a succession of rejection notches at even multiples of half the line frequency ($f_H$) and an interleaved succession of response peaks at odd multiples of half the line frequency. The output of combiner 170 is applied to a bandpass filter 180, having a passband centered about the desired output color subcarrier frequency ($f_o$), with a bandwidth substantially matching the output chrominance component band (e.g., 3.08 –4.08 MHz). The output of filter 180 is thus a separated chrominance component in the highband location desired for output use, suitable for application to an output composite signal forming circuit, constituted by an adder 320.

For an explanation of the derivation of the luminance component input to adder 320, it is necessary to consider the operation of further circuitry responsive to the output of delay line 160. An output of the 1H delay line 160 is applied to an amplitude modulation detector 190, which recovers a composite video signal from the amplitude modulated carrier waves passed by delay line 160. A low pass filter 200 is coupled to the output of detector 190, and has a cutoff frequency chosen to block passage of carrier and sideband components from the output of detector 190. To reduce the filtering requirements, so that relatively little signal delay need to be introduced by low pass filter 200, it is desirable to choose a full wave rectifying form of envelope detector as detector 190, A composite video signal output of low pass filter 200, applied via delay device 210, serves as the stored "substitution" signal input at terminal S of apparatus 80.

A composite video signal output of low pass filter 200 is applied to a phase splitter 230, providing respective oppositely phased versions of the composite video signal as outputs. The respective outputs are delivered to respective adders 240 and 260 for respective combinations with a common input signal, applied to the respective adders from the output terminal 0 of switching apparatus 80 via a delay device 250. The delay device 250 provides a signal delay of a time duration substantially matching the delay (e.g., 70 nanoseconds) introduced by low pass filter 200.

The poling of the phase splitter output delivered to adder 240 is such that its additive combination with the output of delay device 250 provides a comb filtering action of a type permitting luminance component passage (i.e., of a type providing a succession of rejection notches at odd multiples of half the line frequency ($f_H$) and an interleaved succession of response peaks at even multiples of half the line frequency). The comb filter thus realized desirably provides a luminance component output (inclusive of deflection synchronizing components) free of the buried subcarrier chrominance component. However, the combing action extends below the shared midband, and thus eliminates luminance components in an unshared lowband (e.g., 0 –1 MHz) including components desired for retention for adequate vertical detail rendition in reproduced images.

The opposite poling of the phase splitter output delivered to adder 260, however, is such that its additive combination with the output of delay device 250 results in a comb filtering action of a type complementary to that provided by adder 240, whereby components eliminated in the output of adder 240 are present in the output of adder 260. The output of adder 260 is applied to a low pass filter 270 having a cutoff frequency below the lowest buried subcarrier sideband component frequency, with an illustrative choice permitting passage of a vertical detail signal in a band of approximately 0 – 500 KHz while blocking passage of the buried subcarrier chrominance component.

The output of low pass filter 270 is applied to an adder 280 for additive combination with the output of adder 240. A delay device 290 (illustratively, of a coaxial line type such as is conventionally employed for luminance delay in color television receivers) is interposed in the coupling of the adder 240 output to an input of adder 280, with the signal delay introduced thereby chosen to substantially match the delay introduced by low pass filter 270 (illustratively, of the order of 600 nanoseconds).

The output of adder 280 comprises a luminance signal with restored vertical detail information, with the adding of the complementary comb filter outputs effectively providing a "filling in " of the luminance component combing over a low band determined by the passband of filter 270 (in the manner discussed, for example, in U.S. Pat. No. 2,729,698, issued to G. Fredendall). The output of adder 280 is supplied to a de-emphasis circuit 300 which provides a de-emphasis of luminance component high frequencies in a manner suitably complementary to the pre-emphasis thereof employed in the disc recording operation. The output of the de-emphasis circuit 300 is applied to a clamp circuit 310, which serves to restore the DC component of the luminance signal. Illustratively, the clamp circuit 310 is of the keyed clamp type, and keyed by periodic, line rate, keying pulses timed to coincide with periodic reference amplitude intervals of the luminance signal (e.g., during horizontal sync tip appearances).

The clamped output of circuit 310 forms the luminance component input to adder 320, which serves to add such input to the highband chrominance component output of bandpass filter 160 to develop an output composite color video signal of a form suitable for application to a color television receiver. Where such application is to be to the receiver's antenna terminals, the output of adder 320 may serve as the composite video signals input to transmitter apparatus of such a form, for example, as is shown in U.S. Pat. No. 3,775,555, issued to D. J. Carlson on Nov. 27, 1973.

An additional input to the output adder 320 is desirably a squelch control signal serving to block output signal development by adder 320 when input signal conditions are not appropriate for image display. Illustratively, the squelch control signal is supplied from an output terminal SQ of a squelch control signal generator 330, responsive to a defect switching signal derived from generator 70, as in the manner described in my copending U.S. patent application, Ser. No. 590,484, entitled "Squelch Circuit", now Pat. No. 4,017,677, and concurrently filed herewith.

Pursuant to the principles of the present invention, the player apparatus of FIG. 1 includes a sync separator 340, disposed to be responsive to the output of de-emphasis circuit 300 and serving to separate deflection synchronizing components from the picture-representative signal components of the luminance comb filter output. An output of sync separator 340 is supplied to a clamp keying pulse generator 350 to accurately time the generation of keying pulses for application to the above-discussed keyed clamp circuit 310. Also responsive to an output of sync separator 340 is a burst gating pulse generator 360, developing gating pulses timed to substantially coincide with the periodic appearances of color synchronizing burst components in the output of modulator 90. The gating pulse output of generator 360 establishes the signal passing intervals for burst gate 120 in the PLL system controlling VCO 100.

The sync separator 340 is shown in the FIG. 1 arrangement as having an additional separated sync output available at output terminal SS for other player uses. Illustratively, such other player uses may include end-of-play identification, as explained in my copending U.S. patent application, Ser. No. 590,483, entitled "End-of-Play Control System", now Pat. No. 4,017,678 and concurrently filed herewith.

The indicated location of sync separator 340 takes advantage of the comb filtering function of circuits 150, the high frequency de-emphasis function of circuit 300, and the stored signal substitution function of apparatus 80 to lessen the likelihood of spurious pulse appearance in the separator output, whereby reliability of the operation of such sync-responsive operations as those performed by the PLL system burst gate 120 and the luminance signal clamp circuit 310 is enhanced.

By virtue of the comb filtering action performed by circuits 150, the input to sync separator 340 is desirably free of color synchronizing burst components (normally occupying the horizontal sync "backporch" interval), whereby the possibility of burst interference with proper sync separator action is substantially precluded.

The operation of de-emphasis circuit 300 on the luminance comb filter output, prior to its application to sync separator 340, lessens the likelihood of high frequency noise component interference with proper sync separator action, since the relative amplitude of such noise components is significantly reduced in circuit 300. The operation of de-emphasis circuit 300 also substantially precludes the possibility of false interpretation by the sync separator 340 of a rapid white-to-black transistion in the picture signal as a sync pulse leading edge, since the effects of recording pre-emphasis in relative augmentation of the amplitude of such transistions (still present, for example, in the outputs of low pass filters 50 and 200) is removed by de-emphasis circuit 300.

The stored signal substitution function, performed by apparatus 80 when defect detector 60 determines the existence of spurious signal components in the output of pickup circuits 10, effectively isolates the sync separator 340 from such spurious components appearing in the output of low pass filter 50, substantially precluding confusion of such spurious components with legitimate sync pulse components.

Figure 2:
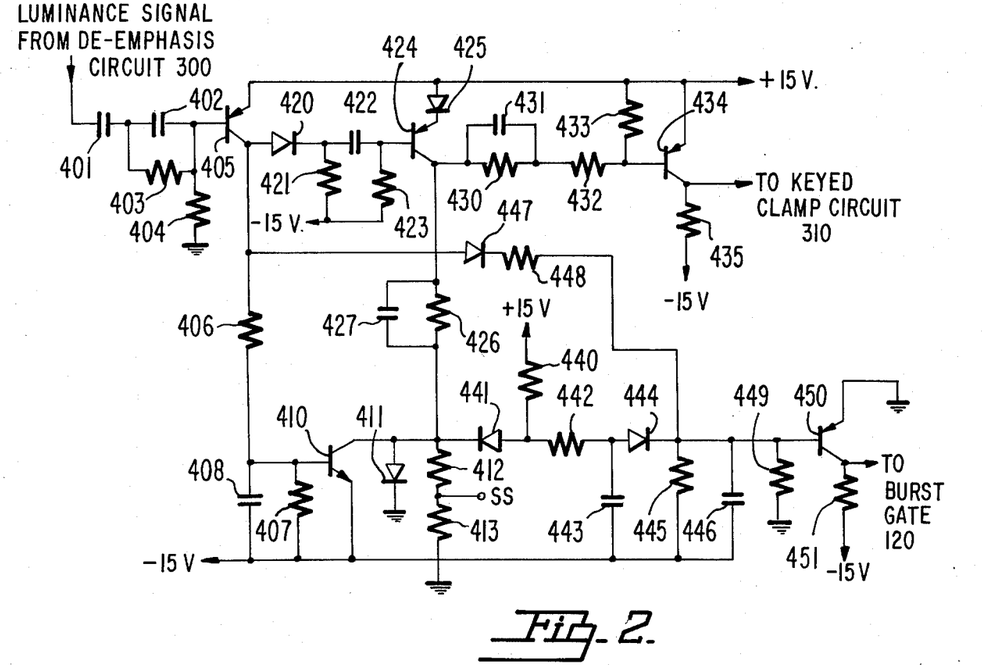
FIG. 2 shows schematically an illustrative form for apparatus performing sync separator, burst gating pulse generator, and clamp keying pulse generator functions in the FIG. 1 arrangement, pursuant to a specific embodiment of the present invention.

A specific manner in which the functions of sync separator 340, keying pulse generator 350, and gating pulse generator 360, in the FIG. 1 arrangement, may be advantageously implemented, pursuant to further features of the present invention, is illustrated by the schematic circuitry of FIG. 2. In the circuit arrangement of FIG. 2, luminance signal information from the output of de-emphasis circuit 300 (FIG. 1) is applied to the base of a PNP transistor 405 with a polarity such that the accompanying deflection synchronization pulse components are negative-going. The application is effected via a path comprising a capacitor 401 in series with a parallel R-C combination (formed by capacitor 402 shunted by resistor 403). A DC path between the base of transistor 405 and a point of ground potential is provided by resistor 404. The emitter of transistor 405 is connected to a positive potential source (illustratively, +15 volts), while the collector of transistor 405 is connected to a negative potential source (illustratively, −15 volts) via the series combination of resistors 406 and 407.

Figure 3A:
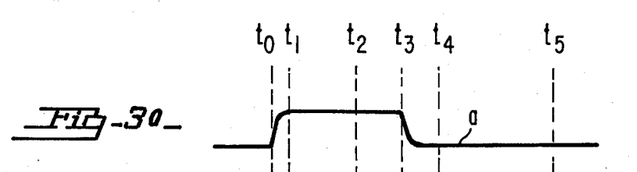
FIGS. 3a-f illustrate graphically waveforms of aid in explaining the operation of the apparatus schematically illustrated in FIG. 2.

The negative-going sync pulse components applied to the base of transistor 405 drive transistor 405 into conduction. With appropriate time constants for the base circuitry, a bias is developed which holds transistor 405 cut off during the picture signal intervals intervening between successive sync pulses. Waveform "a" of FIG. 3a illustrates the potential changes at the collector of transistor 405 during the appearance at the transistor base of a horizontal sync pulse, and during the subsequent "backporch" interval. Upon the appearance of the sync pulse leading edge (at time $t_o$), the collector potential rises rapidly from a negative potential value (approximately −15 volts) to a positive potential value (approximately +15 volts). The collector potential remains at this positive value until the appearance of the sync pulse trailing edge (at time $t_3$) drives transistor 405 into cut off, and the collector potential returns to its former negative potential value, remaining thereat throughout the backporch interval.

A capacitor 408 shunts resistor 407, which is also shunted by the base-emitter path of an NPN transistor 410. Resistor 406 and capacitor 408 cooperate to deliver an integrated version of the waveform at the collector of transistor 405 to the base of transistor 410. The integrating action delays the turn-on of transistor 410 (until a time $t_1$) relative to the sync pulse leading edge appearance at the collector of transistor 405. The delay duration $(t_1 - t_o)$ is controlled by the values of resistors 406 and 407 and capacitor 408, and is illustratively chosen to be approximately 300 nanoseconds.

The collector of transistor 410 is connected to the cathode of a diode 441, the anode of which is connected (via a resistor 440) to the +15 volt source. An additional direct current path between the collector of transistor 410 and the +15 volt source is provided by the series combination of resistors 426, 430, 432 and 433. When transistor 410 is conducting, and its collector drops to approximately the potential of the −15 volt source to which its emitter is connected, current is drawn from the +15 volt source through both of the aforesaid current paths. The collector of transistor 410 is also connected to the anode of diode 411, the cathode of which is connected to a point of ground potential. When transistor 410 is non-conducting, diode 411 clamps the collector to a potential slightly above ground potential to protect transistor 410.

Figures 3B, 3C, 3D:
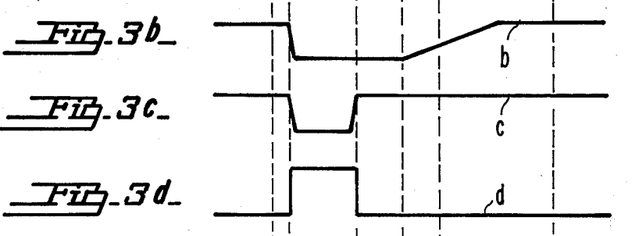

Waveform "b" of FIG. 3b illustrates the potential variations at the collector of transistor 410 during the time interval of interest. As illustrated, the collector potential remains unchanged at time $t_o$ (at a level slightly above ground potential), but, at time $t_1$ (when transistor 410 commences conduction) rapidly drops to a negative potential (approximately −15 volts). The collector of transistor 410 remains at this potential until time $t_3$ (sync pulse trailing edge occurrence), when it commences a slow rise to its initial positive potential.

The collector of transistor 405 is connected to the anode of diode 420, the cathode of which is connected, via a capacitor 422, to the base of a PNP transistor 424. A resistor 421 connects the cathode of diode 420 to the −15 volt source, and a resistor 423 connects the base of transistor 424 to the −15 volt source. During conduction by transistor 405 (in response to sync pulse appearance) diode 420 is rendered conducting, and capacitor 422 and resistor 423 cooperate to deliver a differentiated version of the waveform at the collector of transistor 405 to the base of transistor 424. The emitter of transistor 424 is connected to the cathode of diode 425, the anode of which is connected to the +15 volt source. The collector of transistor 424 is connected to the junction of the previously mentioned resistors 426, 430.

The differentiated waveform applied to the base of transistor 424 drives the base sufficiently positive during an initial segment of the sync pulse interval to cut off the normally conducting transistor 424. At an intermediate point (time $t_2$) in the sync pulse interval the differentiated waveform drops sufficiently to permit again forward bias development across the series combination of diode 425 and the base-emitter path of transistor 424, whereupon transistor 424 recommences conduction. The cutoff interval duration ($t_2 - t_1$) is controlled by the values of capacitor 422 and resistor 423, and is illustratively chosen to be 1.4 microsecond.

Waveform "c" of FIG. 3c illustrates the potential variations at the collector of transistor 424 during the time interval of interest. The collector potential, clamped to the +15 volt source value by the conducting transistor 424 prior to time $t_o$, does not depart significantly from this value during the interval between $t_o$ and $t_1$, despite the cut-off of transistor 424, because of the charge retained by capacitor 427 (shunted across resistor 426). However, at time $t_1$, when the delayed conduction by transistor 410 commences and drops the remote terminal of resistor 426 to the −15 volt potential level, the voltage at the collector of transistor 424 follows, dropping to an illustrative level at +9 volts. The collector potential remains at this depressed level until time $t_2$ when conduction by transistor 424 again clamps the collector potential to the +15 volt value.

The base-emitter path of a PNP transistor 434 is shunted across the previously mentioned resistor 433, so that the base of transistor 434 is linked to the collector of transistor 424 via the series combination of resistors 430 and 432, and driven by the aforementioned waveform "c". The emitter of transistor 434 is directly connected to the +15 volt source, while the collector of transistor 434 is connected to the −15 volt source via a resistor 435. Transistor 434 is normally cut off, but conducts during the interval between $t_1$ and $t_2$ in response to waveform "c".

Waveform "d" of FIG. 3d illustrates the potential variations at the collector of transistor 434.

The collector remains at a negative potential (illustratively −9 volts) except during the $t_1 - t_2$ time interval (e.g., of 1.1 microsecond duration) when it is elevated to a +15 volt level. Waveform "d" constitutes the keying pulse waveform supplied to keyed clamp circuit 310 (FIG. 1).

To aid rapid turn-on and turn-off of transistor 434, a "speed-up" capacitor 431 is shunted across resistor 430. Capacitor 427, in shunt with resistor 426, also serves a speed-up purpose, aiding rapid turn-on of transistor 434.

It will be noted that the operation of the above-described circuitry provides accurate confinement of the clamp keying pulse duration to an intermediate portion of the sync pulse interval, reducing the possibility of clamping on noise with resultant erroneous DC restoration. Clamp keying pulse generation occurs only upon coincidence of transistor 424 cut-off with transistor 410 conduction. With differentiator control of the former and integrator control of the latter, short duration noise pulses are unlikely to effect such coincidence.

For burst gating pulse generation purposes, the circuitry of FIG. 2 also includes a PNP transistor 450. The emitter of transistor 450 is directly connected to a point of ground potential, while the collector is connected to the −15 volt source via resistor 451, and the base is connected to a point of ground potential via resistor 449. The parallel combination of resistor 445 and capacitor 446 is connected between the −15 volt source and the base of transistor 450. The base of transistor 450 is also connected via a resistor 448 to the cathode of diode 447, the anode of which is connected to the collector of transistor 405. Finally, the base of transistor 450 is connected to the cathode of diode 444, the anode of which is connected to the junction of resistor 442 and capacitor 443. The latter elements are disposed in series between the anode of diode 441 and the −15 volt source.

Figure 3E:
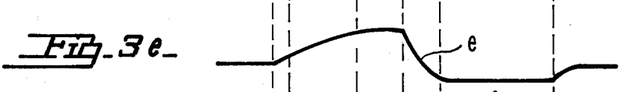

Waveform "e" of FIG. 3e illustrates the potential variations at the base of transistor 450. During a picture signal interval (e.g., prior to time $t_o$), when both transistor 405 and transistor 410 are cut off: (a) diode 447 is non-conductive, isolating the base of transistor 450 from the collector of transistor 405; (b) diodes 441 and 411 are conducting, clamping the junction of resistors 440 and 442 to a low positive potential; and (c) diode 444 is conducting, completing a voltage divider, also including resistors 442, 445, 449 between the clamped junction and the −15 volt source, which establishes the potential at the cathode of diode 444 (and thus at the base of transistor 450) at approximately ground potential.

When transistor 405 commences conduction, diode 447 becomes forward biased and current flowing through resistor 448 charges capacitor 446, elevating the potential at the base of transistor 450 to a higher positive potential (e.g., approximately +2 volts). Diode 444 is now nonconductive, isolating the base of transistor 450 from capacitor 443. At time $t_1$, when transistor 410 becomes conducting, diode 411 opens and capacitor 443 rapidly discharges (via resistor 442, diode 441 and transistor 410), dropping the anode of diode 444 to a potential slightly above that of the −15 volt source. With this activity increasing the reverse biasing of diode 444, the base of transistor 450 remains isolated from capacitor 443.

At time $t_3$, when transistor 405 becomes nonconducting, diode 447 opens, and capacitor 446 begins to discharge via resistors 445, 449. As the discharge of capacitor 446 continues, the potential at the base of transistor 450 finally drops sufficiently below ground potential (at time $t_4$) to turn on transistor 450. During the subsequent conduction period for transistor 450, its base is effectively clamped at this turn-on potential level.

With transistor 410 desirably chosen to have a fast turn-off characteristic, the cut-off of transistor 410 occurs substantially simultaneously with the turn-off of transistor 405. Thus, at time $t_3$, the recharging of capacitor 443 commences via a charging path comprising the series combination of resistors 440 and 442. After a time period determined by the charging time constant established by the values of resistors 440, 442 and capacitor 443, the potential at the anode of diode 444 has risen sufficiently to forward bias diode 444, and a recharging of capacitor 446 commences, which serves to cut off transistor 450 at time $t_5$. By suitably relating the choice of values for the charging circuit (440, 442, 443) and discharging circuit (445, 446, 449), one may accurately locate the conduction period for transistor 450 in a desired region of the backporch interval. Illustratively, the conduction period commences 660 nanoseconds after time $t_3$ (sync pulse trailing edge), and endures for 2 microseconds.

Figure 3F:
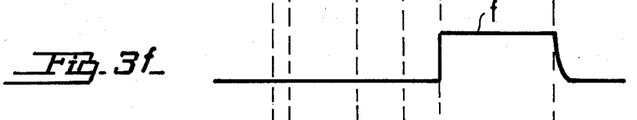

Waveform "f" of FIG. 3f illustrates the potential variations at the collector of transistor 450. As illustrated, this collector potential remains at the potential of the −15 volt source, except for the conduction period (from time $t_4$ until time $t_5$) of transistor 450, when it is elevated to approximately ground potential. Waveform "f" consitutes the burst gating pulse waveform supplied to burst gate 120 (FIG. 1).

It will be noted that the operation of the above-described circuitry permits accurate confinement of the burst gating pulse occurrence to an intermediate portion of the backporch interval segment occupied by the color synchronizing burst, reducing the possibility of passage of spurious information to the phase detector 130 of the FIG. 1 PLL system.

It may further be noted that the nature of the burst gating pulse generation is such that gating pulse development cannot occur until after conduction by transistor 410 has caused discharge of capacitor 443. In view of the intergrating function performed by elements 406, 408, narrow noise pulses occuring during a picture signal interval, for example, do not result in conduction by transistor 410, though they may turn on transistor 405. The failure of transistor 410 to conduct under these circumstances thus precludes false burst gating pulse generation in response to such noise pulses.

An illustrative set of values for the circuit parameters of the FIG. 2 arrangement is as follows:

| | |
|---|---|
| Resistor 403 | 1,000 ohms |
| Resistor 404 | 56,000 ohms |
| Resistor 406 | 5,600 ohms |
| Resistor 407 | 270 ohms |
| Resistor 412 | 12,000 ohms |
| Resistor 413 | 10,000 ohms |
| Resistor 421 | 68,000 ohms |
| Resistor 423 | 20,000 ohms |
| Resistor 426 | 27,000 ohms |
| Resistor 430 | 10,000 ohms |
| Resistor 432 | 1,000 ohms |
| Resistor 433 | 1,000 ohms |
| Resistor 435 | 2,700 ohms |
| Resistor 440 | 5,100 ohms |
| Resistor 442 | 470 ohms |
| Resistor 445 | 10,000 ohms |
| Resistor 448 | 5,600 ohms |
| Resistor 449 | 3,300 ohms |
| Resistor 451 | 1,400 ohms |
| Capacitor 401 | 5.6 microfarads |
| Capacitor 402 | .27 microfarads |
| Capacitor 408 | .0015 microfarads |
| Capacitor 422 | 100 picofarads |
| Capacitor 427 | 100 picofarads |
| Capacitor 431 | 180 picofarads |
| Capacitor 443 | 560 picofarads |
| Capacitor 446 | 390 picofarads |
| Diodes (all) | Type 1N914 |
| Transistors 405, 450 | Type 2N3905 |
| Transistor 410 | Type MPS 834 |
| Transistors 424, 434 | Type MPSA70 |

I claim:

1. In disc record playback apparatus including a pickup system for recovering from a disc record carrier waves frequency modulated in accordance with a composite color video signal, said composite color video signal including a deflection synchronizing component and picture signal components comprising a luminance signal component occupying a given frequency band and a chrominance signal component sharing a portion of said given frequency;

frequency demodulation apparatus responsive to a carrier wave output of said pickup system for developing a demodulated signal output substantially confined to said given frequency band;

a source of oscillations at a frequency above said given frequency band;

means for modulating the amplitude of oscillations from said source in accordance with said demodulated signal output of said frequency demodulation apparatus;

first comb filter means, including a 1H delay line having an input receiving an output of said modulating means, for developing a first comb filtered signal output substantially free of said chrominance signal component, said first comb filter means having a frequency response characteristic exhibiting a plurality of regularly spaced nulls over said shared portion of said given frequency band;

second comb filter means, including said 1H delay line, for developing a second comb filtered signal output substantially free of said luminance signal component;

means for deriving a delayed composite color video signal from said 1H delay line;

means for identifying departures from a given frequency deviation range of the instantaneous frequency of the signals supplied to said frequency demodulation apparatus;

means responsive to the output of said departure identifying means for altering the operation of said modulating means during said departures so that the amplitude of said oscillations from said source is modulated in accordance with said delayed composite color video signal provided by said deriving means, in place of the signal output of said frequency demodulation apparatus;

a de-emphasis circuit responsive to said first comb filtered signal output of said first comb filter means for developing a de-emphasized signal output, said de-emphasis circuit having a frequency response characteristic exhibiting a declining response with increase in input frequency over a portion of said given frequency band;

an adder, responsive to respective outputs of said de-emphasis circuit and of said second comb filter means, for forming a composite color video signal output; and means for recovering said deflection synchronizing component to the substantial exclusion of other components of said signal output of said frequency demodulation apparatus; said recovering means comprising a sync separator having an input, and means, independent of said adder and responsive to an output of said de-emphasis circuit, for coupling a de-emphasized version of said first comb filtered signal output of said first comb filter to said input of said sync separator.

2. Apparatus in accordance with claim 1;

wherein said chrominance coomponent comprises sidebands of a modulated color subcarrier, said subcarrier having a nominal frequency corresponding to a given odd multiple of half the line frequency of said composite color video signal;

wherein said chrominance component also includes a color synchronizing component comprising recurring bursts of oscillations at the frequency of said subcarrier;

said apparatus also including:

pulse generating means;

means coupled to said sync separator for utilizing said recovered deflection synchronizing component to control the timing of pulse generation by said pulse generating means;

a reference oscillator;

means, responsive to pulses generated by said pulse generating means, to an output of said reference oscillator, and to an output of said modulating means, for detecting frequency variations of said color synchronizing component; and means for varying the frequency of said oscillations from said source in response to said detected frequency variations of said color synchronizing component.

3. In disc record playback apparatus including a pickup system for recovering from a disc record carrier waves frequency modulated in accordance with a composite color video signal, said composite color video signal including a deflection synchronizing component and picture signal components comprising a luminance signal component occupying a given frequency band and a chrominance signal component sharing a portion of said given frequency band; said chrominance component comprising sidebands of a modulated color subcarrier, said subcarrier having a nominal frequency corresponding to a given odd multiple of half the line frequency of said composite color video signal; said chrominance components also including a color synchronizing component comprising recurring bursts of oscillations at the frequency of said subcarrier; the combination comprising:

frequency demodulation apparatus responsive to a carrier wave output of said pickup system for developing a demodulated signal output substantially confined to said given frequency band;

a source of oscillations at a frequency above said given frequency band;

means for varying the frequency of said oscillations from said source in response to frequency variations of said color synchronizing component;

means for modulating the amplitude of said oscillations from said source in accordance with said demodulated signal output of said frequency demodulation apparatus;

comb filter means responsive to said demodulated signal output of said frequency demodulation apparatus, and including a 1H delay line having an input receiving an output from said modulating means, for developing a comb filtered signal output, said comb filter means having a frequency response characteristic exhibiting a plurality of regularly spaced nulls over said shared portion of said given frequency band, said regularly spaced nulls falling at frequencies corresponding to a plurality of respective odd multiples of half said line frequency, inclusive of said given odd multiples;

a de-emphasis circuit responsive to said comb filtered signal output of said comb filter means for developing a de-emphasized signal output, said de-emphasis circuit having a frequency response characteristic exhibiting a declining response with increase in input frequency over a portion of said given frequency band;

additional comb filter means responsive to the input and output of said 1H delay line for passing a frequency shifted version of said chrominance signal component, appearing in a sideband portion of said output of said modulating means; said additional comb filter means having a plurality of regularly spaced nulls falling at frequencies corresponding to respective even multiples of half said line frequency, and said frequency shifted version of said chrominance component occupying a band of frequencies above said given frequency band;

output composite color video signal forming means responsive to said de-emphasized signal output of said de-emphasis circuit, and to said frequency shifting version of said chrominance component passed by said additional comb filter means;

means for separating said deflection synchronizing component from other components of said composite color video signal; said separating means comprising a sync separator, and means, independent of said output composite color video signal forming means, for rendering said sync separator responsive to said de-emphasized signal output of said de-emphasis circuit;

pulse generating means; and means coupled to said sync separator for utilizing said separated deflection synchronizing component to control the timing of pulse generation by said pulse generating means.

4. Apparatus in accordance with claim 3 wherein said frequency varying means includes:

gating means for passing an output of said modulating means when enabled;

a source of reference oscillations at a desired output color subcarrier frequency;

a phase detector for comparing the phase of signals passed by said gating means with the phase of said reference oscillations;

means for utilizing the output of said phase detector to control the frequency of said oscillations subject to modulation by said modulating means; and means utilizing an output of said pulse generating means to periodically enable said gating means.

5. In disc record playback apparatus including a pickup system for recovering from a disc record carrier waves frequency modulated in accordance with a composite color video signal, said composite color video signal including a deflection synchronizing component and picture signal components comprising a luminance signal component occupying a given frequency band and a chrominance signal component sharing a portion of said given frequency band; said chrominance component comprising sidebands of a modulated color subcarrier, said subcarrier having a nominal frequency corresponding to a given odd multiple of half the line frequency of said composite color video signal; said chrominance component also including a color synchronizing component comprising recurring bursts of oscillations at the frequency of said subcarrier; the combination comprising:

frequency demodulation apparatus responsive to a carrier wave output of said pickup system for developing a demodulated signal output substantially confined to said given frequency band;

a source of oscillations at a frequency above said given frequency band;

means for varying the frequency of said oscillations from said source in response to frequency variations of said color synchronizing component;

means for modulating the amplitude of said oscillations from said source in accordance with said demodulated signal output of said frequency demodulation apparatus;

comb filter means responsive to said demodulated signal output of said frequency demodulation apparatus, and including a 1H delay line having an input receiving an output from said modulating means, for developing a comb filtered signal output, said comb filter means having a frequency response characteristic exhibiting a plurality of regularly spaced nulls over said shared portion of said given frequency band, said regularly spaced nulls falling at frequencies corresponding to a plurality of respective odd multiples of half said line frequency, inclusive of said given odd multiples;

a de-emphasis circuit responsive to said comb filtered signal output of said comb filter means for developing a de-emphasized signal output, said de-emphasis circuit having a frequency response characteristic exhibiting a declining response with increase in input frequency over a portion of said given frequency band;

additional comb filter means responsive to the input and output of said 1H delay line for passing a frequency shifted version of said chrominance signal component, appearing in a sideband portion of said output of said modulating means; said additional comb filter means having a plurality of regularly spaced nulls falling at frequencies corresponding to respective even multiples of half said line frequency, and said frequency shifted version of said chrominance component occupying a band of frequencies above said given frequency band;

output composite color video signal forming means responsive to said de-emphasized signal output of said de-emphasis circuit, and to said frequency shifted version of said chrominance component passed by said additional comb filter means; and means for separating said deflection synchronizing component from other components of said composite color video signal, said separating means being responsive to said de-emphasized signal output of said de-emphasis circuit;

wherein said frequency varying means includes:

gating means for passing an output of said modulating means when enabled;

a source of reference oscillations at a desired output color subcarrier frequency;

a phase detector for comparing the phase of signals passed by said gating means with the phase of said reference oscillations;

means for utilizing the output of said phase detector to control the frequency of said oscillations subject to modulation by said modulating means; and means for periodically enabling said gating means, said enabling means being responsive to an output of said separating means;

wherein said deflection synchronizing component comprises synchronizing pulses nominally recurring at said line frequency, wherein said separating means includes a first transistor subject to conduction during the appearance of each of said recurring synchronizing pulses in said de-emphasized signal output, and wherein said enabling means includes:

integrating means responsive to the output of said separating means;

a second, normally nonconducting, transistor, responsive to the output of said integrating means, and subject to initiation of conduction when conduction by said first transistor persists for a given time interval;

a first capacitor;

means for initiating a discharge of said first capacitor at a first rate in response to the termination of conduction by said first transistor;

gating pulse developing means subject to actuation when said discharge of said first capacitor persists for a first predetermined time period;

a second capacitor, maintained in a substantially discharged state during conduction by said second transistor;

means for charging said second capacitor at a second rate upon the termination of conduction by said second transistor;

means for disabling said gating pulse developing means when said charging of said second capacitor persists for a second given time period; and means for utilizing the output of said gating pulse developing means to effect said enabling of said gating means.

6. In disc record playback apparatus including a pickup system for recovering from a disc record carrier waves frequency modulated in accordance with a composite color video signal, said composite color video signal including a deflection synchronizing component and picture signal components comprising a luminance signal component occupying a given frequency band and a chrominance signal component sharing a portion of said given frequency band; said chrominance component comprising sidebands of a modulated color subcarrier, said subcarrier having a nominal frequency corresponding to a given odd multiple of half the line frequency of said composite color video signal; said chrominance component also including a color synchronizing component comprising recurring bursts of oscillations at the frequency of said subcarrier; the combination comprising:

frequency demodulation apparatus responsive to a carrier wave output of said pickup system for developing a demodulated signal output substantially confined to said given frequency band;

a source of oscillations at a frequency above said given frequency band;

means for varying the frequency of said oscillations from said source in response to frequency variations of said color synchronizing component;

means for modulating the amplitude of said oscillations from said source in accordance with said demodulated signal output of said frequency demodulation apparatus;

comb filter means responsive to said demodulated signal output of said frequency demodulation apparatus, and including a 1H delay line having an input receiving an output from said modulating means, for developing a comb filtered signal output, said comb filter means having a frequency response characteristic exhibiting a plurality of regularly spaced nulls over said shared portion of said given frequency band, said regularly spaced nulls falling at frequencies corresponding to a plurality of respective odd multiples of half said line frequency, inclusive of said given odd multiples;

a de-emphasis circuit responsive to said comb filtered signal output of said comb filter means for developing a de-emphasized signal output, said de-emphasis circuit having a frequency response characteristic exhibiting a declining response with increase in input frequency over a portion of said given frequency band;

additional comb filter means responsive to the input and output of said 1H delay line for passing a frequency shifted version of said chrominance signal component, appearing in a sideband portion of said output of said modulating means; said additional comb filter means having a plurality of regularly spaced nulls falling at frequencies corresponding to respective even multiples of half said line frequency, and said frequency shifted version of said chrominance component occupying a band of frequencies above said given frequency band;

output composite color video signal forming means responsive to said de-emphasized signal output of said de-emphasis circuit, and to said frequency shifted version of said chrominance component passed by said additional comb filter means; and means for separating said deflection synchronizing component from other components of said composite color video signal, said separating means being responsive to said de-emphasized signal output of said de-emphasis circuit;

wherein the de-emphasized signal output of said de-emphasis circuit to which said output composite color video signal forming means responds is subject to DC restoration prior to application to said forming means, said DC restoration being effected by a keyed clamp circuit; wherein said deflection synchronizing component comprises synchronizing pulses nominally recurring at said line frequency; and wherein said separating means includes a first transistor subject to conduction during the appearance of each of said recurring synchronizing pulses in said de-emphasized signal output; said apparatus also including:

integrating means responsive to the output of said separating means;

a second, normally nonconducting, transistor, responsive to the output of said integrating means, and subject to initiation of conduction when conduction by said first transistor persists for a given time interval;

differentiating means responsive to the output of said separating means;

a third, normally conducting, transistor responsive to the output of said differentiating means, and subject to cutoff for a given time period subsequent to initiation of conduction of said first transistor by a synchronizing pulse appearance;

means for developing keying pulses during those time periods when conduction by said second transistor coincides with nonconduction of said third transistor; and means for utilizing said keying pulses to control the operation of said keyed clamp circuit.

7. In a video record player including means for deriving composite video signals representative of recorded picture information from a record, said composite video signals including synchronizing pulses occupying recurring synchronizing signal intervals; the combination comprising:

a sync separator, responsive to an output of said deriving means, and including a first transistor rendered conducting during said recurring synchronizing signal intervals by said synchronizing pulses;

integrating means responsive to an output of said sync separator;

a second, normally nonconducting, transistor, responsive to the output of said integrating means, and subject to initiation of conduction when conduction by said first transistor persists for a given time interval;

differentiating means responsive to an output of said sync separator;

a third, normally conducting, transistor responsive to the output of said differentiating means, and subject to cutoff for a given time period subsequent to initiation of conduction of said first transistor by a synchronizing pulse appearance;

means, coupled to said second and third transistors, for developing keying pulses during those time periods when conduction by said second transistor coincides with nonconduction of said third transistor;

means for subjecting said derived video signals to DC restoration, said subjecting means comprising a keyed clamped circuit responsive to an output of said deriving means; and means for utilizing said keying pulses to effect keying of said keyed clamp circuit during intermediate portions of said recurring synchronizing signal intervals.

8. In a video record player including means for deriving composite color video signals representative of recorded color picture information from a record; said composite color video signals including (a) luminance signal components, (b) deflection synchronizing components comprising deflection synchronizing pulses occupying recurring deflection synchronizing signal intervals, (c) chrominance signal components comprising modulated color subcarrier waves, and (d) color synchronizing components comprising bursts of oscillations of subcarrier frequency occupying recurring color synchronizing signal intervals; the combination comprising:

first comb filter means responsive to said derived composite video signals for passing said luminance signal components and said deflection synchronizing components to the substantial exclusion of said chrominance signal components and said color synchronizing components;

a sync separator, responsive to an output of said first comb filter means, and including a first transistor rendered conducting during said recurring deflection synchronizing signal intervals by said deflection synchronizing pulses;

second comb filter means responsive to said derived composite video signals for passing said chrominance signal components and said color synchronizing components to the substantial exclusion of said luminance signal components and said deflection synchronizing components;

color synchronizing component utilization means;

gating means for coupling an output of said second comb filter means to said utilization means when enabled;

integrating means responsive to an output of said sync separator;

a second, normally nonconducting, transistor, responsive to the output of said integrating means, and subject to initiation of conduction when conduction by said first transistor persists for a given time interval;

a first capacitor;

means for initiating a discharge of said first capacitor at a first rate in response to the termination of conduction by said first transistor;

gating pulse developing means subject to actuation when said discharge of said first capacitor persists for a first predetermined time period;

a second capacitor, maintained in a substantially discharged state during conduction by said second transistor;

means for charging said second capacitor at a second rate upon the termination of conduction by said second transistor;

means for disabling said gating pulse developing means when said charging of said second capacitor persists for a second given time period; and means for utilizing the output of said gating pulse developing means to effect said enabling of said gating means.

9. Apparatus in accordance with claim 8 wherein an output of said first comb filter means is subject to DC restoration said DC restoration being effected by a keyed clamp circuit; said apparatus also including:

differentiating means responsive to an output of said sync separator;

a third, normally conducting, transistor responsive to the output of said differentiating means, and subject to cutoff for a given time period subsequent to initiation of conduction of said first transistor by a synchronizing pulse appearance;

means for developing keying pulses during those time periods when conduction by said second transistor coincides with nonconduction of said third transistor; and means for utilizing said keying pulses to control the operation of said keyed clamp circuit.

10. Apparatus in accordance with claim 9, also including:

a source of oscillations; and means for modulating the amplitude of said oscillations from said source in accordance with said derived composite video signals;

wherein said first and second comb filter means include a common 1H delay line having an input receiving an output of said modulating means; and wherein said utilization means comprises means for varying the frequency of said oscillations from said source in response to frequency variations of said color synchronizing component.

11. Apparatus in accordance with claim 10, also including:

output composite color video signal forming means responsive to an output of said keyed clamp circuit, and to an output of said second comb filter means.

* * * * *